(12) United States Patent
Liu et al.

(10) Patent No.: US 12,125,508 B2
(45) Date of Patent: Oct. 22, 2024

(54) TOPOLOGICAL INSULATOR BASED SPIN TORQUE OSCILLATOR READER

(71) Applicant: Western Digital Technologies, Inc., San Jose, CA (US)

(72) Inventors: Xiaoyong Liu, San Jose, CA (US); Zhanjie Li, Pleasanton, CA (US); Quang Le, San Jose, CA (US); Brian R. York, San Jose, CA (US); Cherngye Hwang, San Jose, CA (US); Kuok San Ho, Emerald Hills, CA (US); Hisashi Takano, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/244,555

(22) Filed: Sep. 11, 2023

(65) Prior Publication Data

US 2023/0419990 A1    Dec. 28, 2023

Related U.S. Application Data

(62) Division of application No. 17/828,226, filed on May 31, 2022, now Pat. No. 11,783,853.

(51) Int. Cl.
*G11B 5/39* (2006.01)
*G11B 5/11* (2006.01)

(52) U.S. Cl.
CPC ............. *G11B 5/3909* (2013.01); *G11B 5/11* (2013.01); *G11B 5/3912* (2013.01); *G11B 5/3932* (2013.01); *G11B 5/3967* (2013.01); *G11B 2005/3996* (2013.01)

(58) Field of Classification Search
None
See application file for complete search history.

(56) References Cited

U.S. PATENT DOCUMENTS

| | | | |
|---|---|---|---|
| 5,751,521 | A | 5/1998 | Gill |
| 6,657,823 | B2 | 12/2003 | Kawato |
| 6,667,861 | B2 | 12/2003 | Gill |
| 6,680,828 | B2 | 1/2004 | Gill |
| 6,906,898 | B2 | 6/2005 | Kawato |
| 7,016,160 | B2 | 3/2006 | Mao et al. |
| 7,242,556 | B2 | 7/2007 | Gill |

(Continued)

FOREIGN PATENT DOCUMENTS

| | | |
|---|---|---|
| CN | 111354392 A | 6/2020 |
| JP | 4934582 B2 | 5/2012 |

(Continued)

OTHER PUBLICATIONS

"A colossal breakthrough for topological spintronics," Tokyo Institute of Technology, Jul. 31, 2018, 4 pages, <https://www.titech.ac.jp/english/news/2018/042001.html>.

(Continued)

*Primary Examiner* — Craig A. Renner
(74) *Attorney, Agent, or Firm* — PATTERSON + SHERIDAN, LLP

(57) ABSTRACT

The present disclosure generally relates to a bismuth antimony (BiSb) based STO (spin torque oscillator) sensor. The STO sensor comprises a SOT device and a magnetic tunnel junction (MTJ) structure. By utilizing a BiSb layer within the SOT device, a larger spin Hall angle (SHA) can be achieved, thereby improving the efficiency and reliability of the STO sensor.

13 Claims, 13 Drawing Sheets

(56) References Cited

U.S. PATENT DOCUMENTS

| | | |
|---|---|---|
| 7,298,595 B2 | 11/2007 | Gill |
| 7,436,632 B2 | 10/2008 | Li et al. |
| 7,643,255 B2 | 1/2010 | Gill |
| 7,697,242 B2 | 4/2010 | Gill |
| 7,881,018 B2 | 2/2011 | Gill et al. |
| 8,125,746 B2 | 2/2012 | Dimitrov et al. |
| 8,174,799 B2 | 5/2012 | Hoshiya et al. |
| 8,223,464 B2 | 7/2012 | Yasui et al. |
| 8,553,346 B2 | 10/2013 | Braganca et al. |
| 8,570,677 B2 | 10/2013 | Braganca et al. |
| 8,570,689 B2 | 10/2013 | Sato et al. |
| 8,654,465 B2 | 2/2014 | Braganca et al. |
| 9,472,216 B1 | 10/2016 | Mauri et al. |
| 9,806,710 B2 | 10/2017 | Flatté |
| 9,929,210 B2 | 3/2018 | Lai et al. |
| 9,947,347 B1 | 4/2018 | Van Der Heijden et al. |
| 10,014,012 B1 | 7/2018 | Song et al. |
| 10,127,933 B2 | 11/2018 | Batra et al. |
| 10,210,888 B1 | 2/2019 | Li et al. |
| 10,483,457 B1 | 11/2019 | Lee et al. |
| 10,490,731 B2 | 11/2019 | Sasaki et al. |
| 10,720,570 B2 | 7/2020 | Le et al. |
| 10,839,831 B1 | 11/2020 | Nguyen et al. |
| 10,867,626 B1 | 12/2020 | Li et al. |
| 10,991,390 B2 | 4/2021 | Kobayashi |
| 11,088,200 B1 | 8/2021 | Xiao |
| 11,094,338 B1 | 8/2021 | Hwang et al. |
| 11,100,946 B1 | 8/2021 | Le et al. |
| 11,222,656 B1 | 1/2022 | Le et al. |
| 11,495,741 B2 | 11/2022 | York et al. |
| 11,532,323 B1 | 12/2022 | Le et al. |
| 2011/0089940 A1 | 4/2011 | Carey et al. |
| 2014/0226239 A1 | 8/2014 | Mihajlovic et al. |
| 2014/0254252 A1 | 9/2014 | Guo |
| 2015/0041934 A1 | 2/2015 | Khvalkovskiy et al. |
| 2015/0287426 A1 | 10/2015 | Mihajlovic et al. |
| 2017/0077392 A1 | 3/2017 | Han et al. |
| 2017/0098545 A1 | 4/2017 | Woodruff |
| 2017/0221506 A1 | 8/2017 | Tan et al. |
| 2017/0271581 A1 | 9/2017 | Seong et al. |
| 2017/0288666 A1 | 10/2017 | Flatté |
| 2017/0365777 A1 | 12/2017 | Mihajlovic et al. |
| 2018/0166500 A1 | 6/2018 | Wang et al. |
| 2018/0358543 A1 | 12/2018 | Le et al. |
| 2018/0366172 A1 | 12/2018 | Wang et al. |
| 2019/0037703 A1 | 1/2019 | Wang et al. |
| 2019/0058113 A1 | 2/2019 | Ramaswamy et al. |
| 2019/0326353 A1 | 10/2019 | O'Brien et al. |
| 2019/0392881 A1 | 12/2019 | Rakshit et al. |
| 2020/0035910 A1 | 1/2020 | Li et al. |
| 2020/0098410 A1 | 3/2020 | Gosavi et al. |
| 2020/0176511 A1 | 6/2020 | Park et al. |
| 2020/0243603 A1 | 7/2020 | Lee et al. |
| 2020/0243752 A1 | 7/2020 | Sasaki |
| 2020/0279992 A1 | 9/2020 | Pham et al. |
| 2021/0056988 A1 | 2/2021 | Chen et al. |
| 2021/0249038 A1 | 8/2021 | Le et al. |
| 2021/0328134 A1 | 10/2021 | Guo et al. |
| 2021/0336127 A1 | 10/2021 | Le et al. |
| 2021/0351342 A1 | 11/2021 | Yui et al. |
| 2021/0367142 A1 | 11/2021 | Lee et al. |
| 2021/0408370 A1 | 12/2021 | York et al. |
| 2022/0005498 A1 | 1/2022 | Le et al. |
| 2022/0013138 A1 | 1/2022 | Hwang et al. |
| 2022/0029090 A1 | 1/2022 | Cho et al. |
| 2022/0044103 A1 | 2/2022 | Nguyen et al. |
| 2022/0068538 A1 | 3/2022 | Apalkov et al. |
| 2022/0069202 A1 | 3/2022 | Nguyen et al. |
| 2022/0310901 A1 | 9/2022 | Oguz et al. |
| 2023/0027086 A1 | 1/2023 | Le et al. |
| 2023/0047223 A1 | 2/2023 | Le et al. |
| 2023/0121375 A1 | 4/2023 | Le et al. |
| 2023/0197132 A1 | 6/2023 | Le et al. |

FOREIGN PATENT DOCUMENTS

| | | |
|---|---|---|
| JP | 2021034480 A | 3/2021 |
| JP | 2021057357 A | 4/2021 |
| JP | 2021128814 A | 9/2021 |
| WO | 2018231292 A1 | 12/2018 |
| WO | 2019054484 A1 | 3/2019 |
| WO | 2019125388 A1 | 6/2019 |
| WO | 2019159885 A1 | 8/2019 |
| WO | 2021221726 A1 | 11/2021 |
| WO | 2023022764 A1 | 2/2023 |

OTHER PUBLICATIONS

Berry et al. "Melting at dislocations and grain boundaries: A phase field crystal study," Physical Review, vol. B 77, No. 224114, 2008, p. 224114-1-224114-5, DOI: 10.1103/PhysRevB.77.224114.

Buffat et al. "Size effect on the melting temperature of gold particles," Physical Review A, vol. 13, No. 6, Jun. 1976, pp. 2287-2298.

Cantwell et al. "Grain boundary complexions," ScienceDirect, Acta Materialia, vol. 62, No. 152, 2014, pp. 1-48, http://dx.doi.org/10.1016/j.actamat.2013.07.037.

Chi et al. "The Spin Hall Effect of Bi—Sb Alloys Driven by Thermally Excited Dirac-like Electronics," Oct. 28, 2019, ArXiv: 1910, 40 pages, https://arxiv.org/pdf/1910.12433.pdf.

Eustathopoulos "Wetting by Liquid Metals-Application in Materials Processing: The Contribution of the Grenoble Group," Metals, 2015, vol. 5, No. 1, pp. 350-370, doi:10.3390/met5010350.

Fan et al. "Magnetization switching through giant spin-orbit torque in a magnetically doped topological insulator heterostructure," Nature Materials, vol. 13, Apr. 28, 2014, pp. 669-704, <<https://doi.org/10.1038/nmat3973>>.

Frolov et al. "Structural phase transformations in metallic grain boundaries," Nature Communications, 2013, vol. 4, No. 1899, pp. 1-7, DOI: 10.1038/ncomms2919.

Han et al. "Self-Biased Differential Dual Spin Valve Readers for Future Magnetic Recording," IEEE Transactions on Magnetics, vol. 48, No. 5, May 2012, pp. 1770-1776, 10.1109/TMAG.2011.2169946.

International Search Report and the Written Opinion for International Application No. PCT/US2020/065156 mailed Mar. 14, 2021, 13 pages.

International Search Report and the Written Opinion for International Application No. PCT/US2020/066902 mailed Apr. 18, 2021, 12 pages.

International Search Report and the Written Opinion for International Application No. PCT/US2021/033197 mailed Jul. 12, 2021, 9 pages.

International Search Report and the Written Opinion for International Application No. PCT/US2021/033912 mailed Jul. 25, 2021, 9 pages.

Khang et al. "A conductive topological insulator with large spin Hall effect for ultralow power spin-orbit torque switching," Nature Materials, vol. 17, pp. 808-813, Sep. 2018, pp. 808-813, https://doi.org/10.1038/s41563-018-0137-y.

Kogtenkova et al. "Grain Boundary Complexions and Phase Transformations in Al- and Cu-Based Alloys," Metals, 2019, vol. 9, No. 1, doi:10.3390/met9010010, 24 pages.

Jabeur et al. "Study of spin transfer torque (STT) and spin orbit torque (SOT) magnetic tunnel junctions (MTJs) at advanced CMOS technology nodes," Electrical and Electronics Engineering: An International Journal, (ELELIJ) vol. 6, No. 1, Feb. 2017, pp. 1-9, 10.14810/elelij.2017.6101.

Lau et al. "Spin-orbit torque switching without an external field using interlayer exchange coupling," Nature Nanotechnology, vol. 11, Sep. 2016, pp. 758-762, <https://doi.org/10.1038/nnano.2016.84>.

Liu "Spin-orbit Torque Driven Magnetization Switching for Non-volatile Memory and Beyond," Carnegie Mellon University, May 2020, Thesis, 157 pages, <https://doi.org/10.1184/R1/11933571.

(56) References Cited

OTHER PUBLICATIONS v1>, <https://kilthub.cmu.edu/articles/Spinorbit_Torque_Driven_Magnetization_Switching_for_Nonvolatile_Memory_and_Beyond/11933571/files/21908046.pdf>.
Roschewsky et al. "Spin-orbit torque and Nernst effect in Bi-Sb/Co heterostructures," Physical Review, vol. B 99, No. 195103, 2019, pp. 195103-1-195103-5, DOI: 10.1103/PhysRevB.99.195103.
Roschewsky et al. "Spin-Orbit Torque and Nernst Effect in BiSb/Co Heterostructures," Center for Energy Efficient Electronics Science, University of California—Berkeley, 2018, 12 pages, https://e3s-center.berkeley.edu/wp-content/uploads/2018/11/43Theme-4_Roschewsky_2018E3Sretreat.pdf.
Shao "Spin-Orbit Torques in Topological Insultators," UCLA Electronic Theses and Dissertations; 2015; 76 pages, https://escholarship.org/content/qt3ds9792s/qt3ds9792s.pdf?t=nys1b5&nosplash=32ac004cc5750a361e60ece735dd2752.
Shirokura et al. "Origin of the Giant Spin Hall Effect in BlSb Topological Insulator," ArXiv: 1810; 27 pages, https://arxiv.org/ftp/arxiv/papers/1810/1810.10840.pdf.
Tanaka et al. "Thermodynamic Evaluation of Nano-Particle Binary Alloy Phase Diagrams," 2001, Zeitschrift für Metallkunde, vol. 92, No. 11, pp. 1236-1241, http://hdl.handle.net/11094/26514.
Teague "X-ray and Mossbauer spectroscopy studies of the silicon-antimony and bismuth-antimony alloys," 1971, Scholar's Mine, Doctoral Dissertations, University of Missouri—Rolla, 167 pages.
U.S. Appl. No. 17/401,856, filed Aug. 13, 2021.
U.S. Appl. No. 17/405,954, filed Aug. 18, 2021.
Walker et al. "Composition-dependent structural transition in epitaxial Bi1-xSbx thin films on Si (111)," Physical Review Materials, vol. 3, 064201, Jun. 7, 2019, 8 pages.
Yao et al. "Influence of Crystal Orientation and Surface Termination on the Growth of BiSb thin films on GaAs Substrates," Accepted Manuscript, Journal of Crystal Growth, 2019, 24 pages, doi: https://doi.org/10.1016/j.icrysgro.2019.01.041.
Yuan et al. "Readback Resolution of Differential Dual CPP Spin Valve Reader," IEEE Transactions on Magnetics, vol. 16, No. 6, Jun. 2010, pp. 1667-1670, 10.1109/TMAG.2010.2045106.
Tuo Fan et al. "Ultrahigh Efficient Spin-Orbit Torque Magnetization Switching in All-Sputtered Topological Insulator—Ferromagnet Multilayer", Jul. 5, 2020, <https://arxiv.org/ftp/arxiv/papers/2007/2007.02264.pdf.
International Search Report and Written Opinion for International Application No. PCT/US2022/027960 dated Sep. 5, 2022.
Zhang et al., "Different types of spin currents in the comprehensive materials database of nonmagnetic spin Hall effect", NPJ Computational Materials, 2021, 167, pp. 1-7, (Year: 2021).
Shirokura et al. "Origin of the Giant Spin Hall Effect in BlSb Topological Insulator," ArXiv: 1810; 27 pages, https://arxiv.org/ftp/arxiv/papers/1810/1810.10840.pdf, Published Oct. 25, 2018.
Demasius, Kai-Uwe, et al. "Enhanced spin-orbit torques by oxygen incorporation in tungsten films." Nature communications 7.1 (2016): 1-7.
International Search Report and Written Opinion dated Nov. 16, 2022 for Application No. PCT/US2022/035654.

TOPOLOGICAL INSULATOR BASED SPIN TORQUE OSCILLATOR READER

CROSS-REFERENCE TO RELATED APPLICATIONS

This application is a divisional of co-pending U.S. patent application Ser. No. 17/828,226, filed May 31, 2022, which is herein incorporated by reference.

BACKGROUND OF THE DISCLOSURE

Field of the Disclosure

Embodiments of the present disclosure generally relate to a spin torque oscillator (STO) sensor having a spin-orbit torque (SOT) device comprising a topological insulator of bismuth antimony (BiSb) and a magnetic tunnel junction (MTJ) structure.

Description of the Related Art

Spin-transfer torque (STT) based spin torque oscillator (STO) devices have been proposed as a read element in hard disk drives (HDD). STO devices detect the spin torque induced magnetic free layer precession/oscillation in the frequency domain. However, STT based STO devices are two-terminal devices and generally require a current to flow perpendicularly through the device. As such, a higher applied current is needed in order to achieve a high signal/frequency output. This higher current is not ideal for reliability concerns. As such, spin-orbit torque (SOT) based 3-terminal STO devices are preferred because, in SOT based STO devices, magnetic layer processing/oscillation is induced by an in-plane current that flows through the SOT layer by the spin Hall effect. At the same time, the signal (frequency) detected is done using a separate current perpendicular to plane (CPP) read current path. Therefore, a large current is not needed. This configuration can provide better device reliability. However, conventional SOT-based STO devices generally induce less precession/oscillation, hence lower signal output and smaller dynamic frequency range due to a low efficiency from a smaller spin Hall angle (SHA).

Bismuth antimony (BiSb) is a material that has been proposed as a SOT layer for various SOT device applications, such as for energy-assisted magnetic recording (EAMR) write heads. BiSb layers are narrow bandgap topological insulators with both giant spin Hall effect and high electrical conductivity.

Therefore, an improved SOT device is needed to utilize a BiSb layer with improved spin Hall angle and efficiency as STO nano-oscillator in HDD reader sensors.

SUMMARY OF THE DISCLOSURE

The present disclosure generally relates to a bismuth antimony (BiSb) based STO (spin torque oscillator) sensor. The STO sensor comprises a SOT device and a magnetic tunnel junction (MTJ) structure. By utilizing a BiSb layer within the SOT device, a larger spin Hall angle (SHA) can be achieved, thereby improving the efficiency and reliability of the STO sensor.

In one embodiment, a sensor comprises: a seed layer; a bismuth antimony (BiSb) layer disposed over the seed layer; a buffer layer disposed over the BiSb layer; an magnetic tunnel junction (MTJ) structure disposed over the buffer layer, wherein the seed layer, the BiSb layer, the buffer layer, and the MTJ structure are disposed at a media facing surface (MFS); and an antiferromagnetic (AFM) layer.

In another embodiment, a sensor comprises: a seed layer; a magnetic tunnel junction (MTJ) structure disposed over the seed layer; a first buffer layer disposed over the MTJ structure; a bismuth antimony (BiSb) layer disposed over the first buffer layer; a second buffer layer disposed over the BiSb layer; a capping layer disposed over the second buffer layer; wherein the seed layer, the MTJ structure, the first buffer layer, the BiSb layer, the second buffer layer, and the capping layer are disposed at a media facing surface (MFS); and an antiferromagnetic (AFM) layer, wherein the AFM is disposed between the seed layer and the capping layer.

In yet another embodiment, a sensor comprises: a bismuth antimony (BiSb) layer having a (012) orientation; a free layer; a MgO layer; a pinning layer; a capping layer; an antiferromagnetic (AFM) layer; and a bias layer disposed at a media facing surface (MFS).

In another embodiment, a method of using a magnetic recording head comprises: flowing a current through a spin orbit torque (SOT) device of a spin torque oscillator (STO) sensor while reading data from a magnetic recording media; and measuring frequency of a precession of the a free layer in the STO sensor, wherein the precession is responsive to a magnetic field generated by the magnetic recording media.

BRIEF DESCRIPTION OF THE DRAWINGS

So that how the above-recited features of the present disclosure can be understood in detail, a more particular description of the disclosure, briefly summarized above, may be had by reference to embodiments, some of which are illustrated in the appended drawings. However, it is to be noted that the appended drawings illustrate only typical embodiments of the disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may benefit from other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a given embodiment achieves a particular advantage is not limiting the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a bismuth antimony (BiSb) based STO (spin torque oscillator) sensor. The STO sensor comprises a SOT device and a magnetic tunnel junction (MTJ) structure. The SOT device comprises a bismuth antimony (BiSb) layer having a thickness of about 5 nm to about 10 nm. By utilizing a BiSb layer within the SOT device, a larger spin Hall angle (SHA) can be achieved, thereby improving the efficiency and reliability of the STO sensor.

A BiSb layer having a (012) orientation has a significant spin Hall angle and high electrical conductivity. Therefore, a BiSb layer having a (012) orientation can form a SOT device. For example, a BiSb layer having a (012) orientation can be used as a spin Hall layer in a SOT device in a magnetic recording head, e.g., as part of a write head such as a MAMR write head. In another example, a BiSb layer having a (012) orientation can be used in nano oscillator devices for reading head applications where a signal is detected in the frequency domain. The SOT device can be in a perpendicular stack configuration or an in-plane stack configuration. The SOT device can be utilized in, for example, write heads, read heads, nano-oscillator based readers, artificial intelligence chips, and other applications. A BiSb layer stack with a (012) orientation has a higher spin Hall angle and higher performance in a SOT device than a BiSb layer with a (001) orientation.

Figure 1:
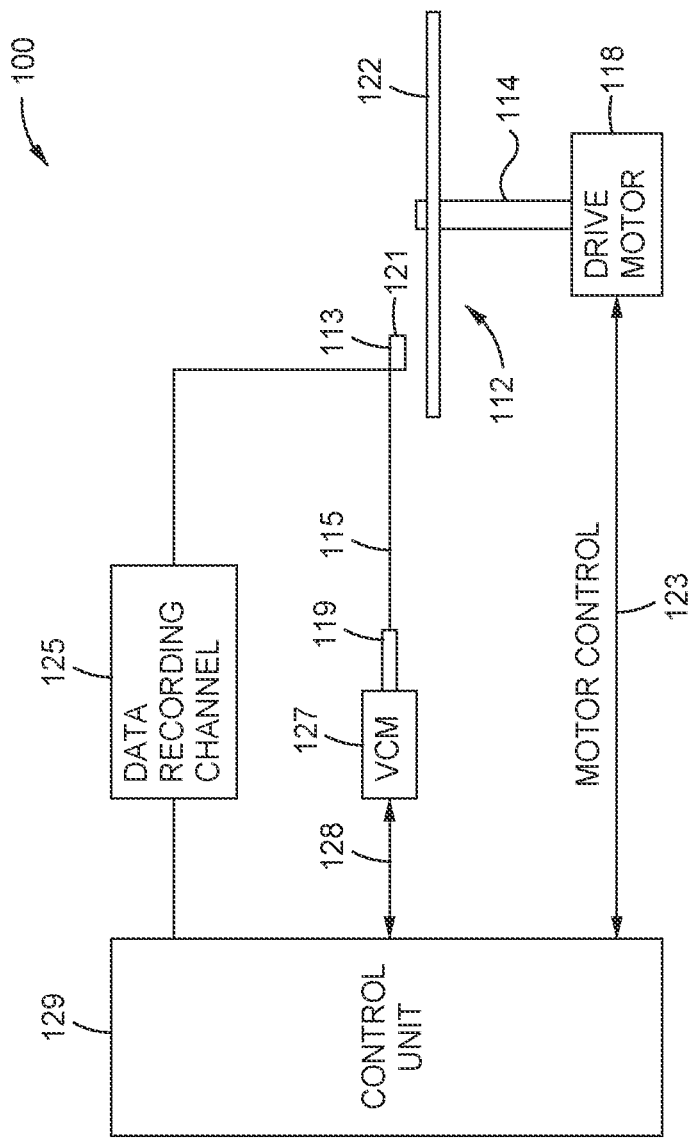
FIG. 1 is a schematic illustration of certain embodiments of a magnetic media drive, including an STO read head having a SOT device.

FIG. 1 is a schematic illustration of certain embodiments of a magnetic media drive 100. Such a magnetic media drive may be a single drive or comprise multiple drives. For the sake of illustration, a single disk drive is shown according to certain embodiments. As shown, at least one rotatable magnetic disk 112 is supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112. Each slider 113 supports one or more magnetic head assemblies 121, including a STO device. As the magnetic disk 112 rotates, the slider 113 moves radially in and out over the disk surface 122. The magnetic head assembly 121 may access different tracks of the magnetic disk 112 where desired data are written. Each slider 113 is attached to an actuator arm 119 using a suspension 115. The suspension 115 provides a slight spring force which biases the slider 113 toward the disk surface 122. Each actuator arm 119 is attached to an actuator means 127. The actuator means 127, as shown in FIG. 1, maybe a voice coil motor (VCM). The VCM includes a coil movable within a fixed magnetic field, the direction, and speed of the coil movements being controlled by the motor current signals supplied by the control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115. In addition, it supports the slider 113 off and slightly above the disk surface 122 by a small, substantially constant spacing during regular operation.

The various components of the disk drive 100 are controlled in operation by control signals generated by the control unit 129, such as access control signals and internal clock signals. Typically, the control unit 129 comprises logic control circuits, storage means, and one or more microprocessors. The control unit 129 generates control signals to control various system operations, such as drive motor control signals on line 123 and head position, and seek control signals on line 128. The control signals on line 128 provide the desired current profiles to optimally move and position the slider 113 to the desired data track on disk 112. In addition, write and read signals are communicated to and from write and read heads on the magnetic head assembly 121 by way of recording channel 125.

The above description of a typical magnetic media drive and the accompanying illustration of FIG. 1 are for representation purposes only. However, it should be apparent that magnetic media drives may contain many media, or disks and actuators, and each actuator may support several sliders.

It is to be understood that the embodiments discussed herein are applicable to a data storage device such as a hard disk drive (HDD) as well as a tape drive such as a tape embedded drive (TED) or an insertable tape media drive, such as those conforming to the LTO (Linear Tape Open) standards. An example TED is described in U.S. Pat. No. 10,991,390, issued Apr. 27, 2021, titled "Tape Embedded Drive," and assigned to the same assignee of this application, which is herein incorporated by reference. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

Figure 2:
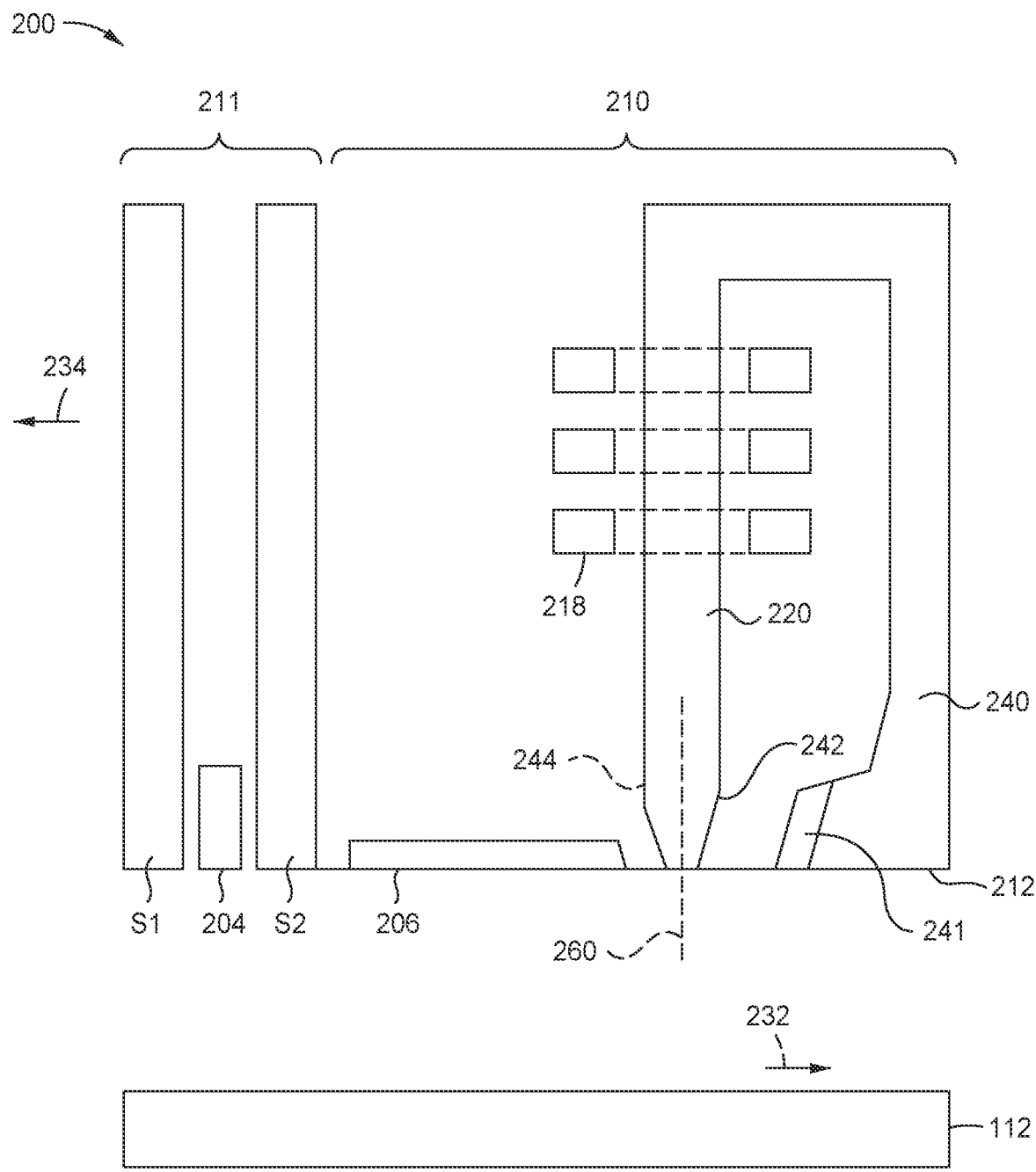
FIG. 2 is a fragmented, cross-sectional side view of certain embodiments of a read head having a SOT based STO sensor.

FIG. 2 is a fragmented, cross-sectional side view of certain embodiments of a recording head 200 having an STO sensor. The recording head 200 faces a magnetic disk 112. The recording head 200 may correspond to the magnetic head assembly 121 described in FIG. 1. In addition, the recording head 200 includes a media-facing surface (MFS) 212, such as a gas-bearing surface, facing disk 112, a magnetic write head 210, and an STO read head 211. As shown in FIG. 2, the magnetic disk 112 moves past the magnetic write head 210 in the direction indicated by the arrow 232, and the recording head 200 moves in the direction indicated by arrow 234.

The magnetic write head 210 includes a main pole 220, a leading shield 206, a trailing shield 240, and a coil 218 that excites the main pole 220. The coil 218 may have a "pancake" structure that winds around a back-contact between the main pole 220 and the trailing shield 240, instead of a "helical" structure shown in FIG. 2. The main pole 220 includes a trailing taper 242 and a leading taper 244. The trailing taper 242 extends from a location recessed from the MFS 212 to the MFS 212. The leading taper 244 extends from an area suspended from the MFS 212 to the MFS 212. The trailing taper 242 and the leading taper 244 may have the same degree of taper, and the degree of taper is measured concerning a longitudinal axis 260 of the main pole 220. In some embodiments, the main pole 220 does not include the trailing taper 242 and the leading taper 244. Instead, the main pole 220 has a trailing side (not shown) and a leading side (not shown), and the trailing side and the leading side are substantially parallel. The main pole 220 may be a magnetic material, such as a FeCo alloy. The leading shield 206 and the trailing shield 240 may be a magnetic material, such as a NiFe alloy. In certain embodiments, the trailing shield 240 can include a trailing shield hot seed layer 241. The trailing shield hot seed layer 241 can consist of a high moment sputter material, such as CoFeN or FeXN, where X comprises Rh, Al, Ta, Zr, and Ti. The trailing shield 240 does not have a trailing shield hot seed layer in certain embodiments.

In some embodiments, the read head 211 is an STO read head or reader with an STO sensing element 204 located between shields S1 and S2. The magnetic fields of the adjacent magnetized regions in the magnetic disk 112 are detectable by the STO sensing element 204 as the recorded bits. In STO sensing elements 204 comprising a BiSb layer, such as the SOT devices described in FIGS. 4A-4D and 5A-5D, the STO reader may be operated in a 2-terminal or a 3-terminal configuration, with an in-plane current flowing inside the SOT (the BiSb layer in this case) device while a small sensing current flows perpendicular to the film plane, and the signal is read out by measuring the frequency of magnetic layer precession. The SOT device of various embodiments can be incorporated into the read head 211.

Figure 3A:
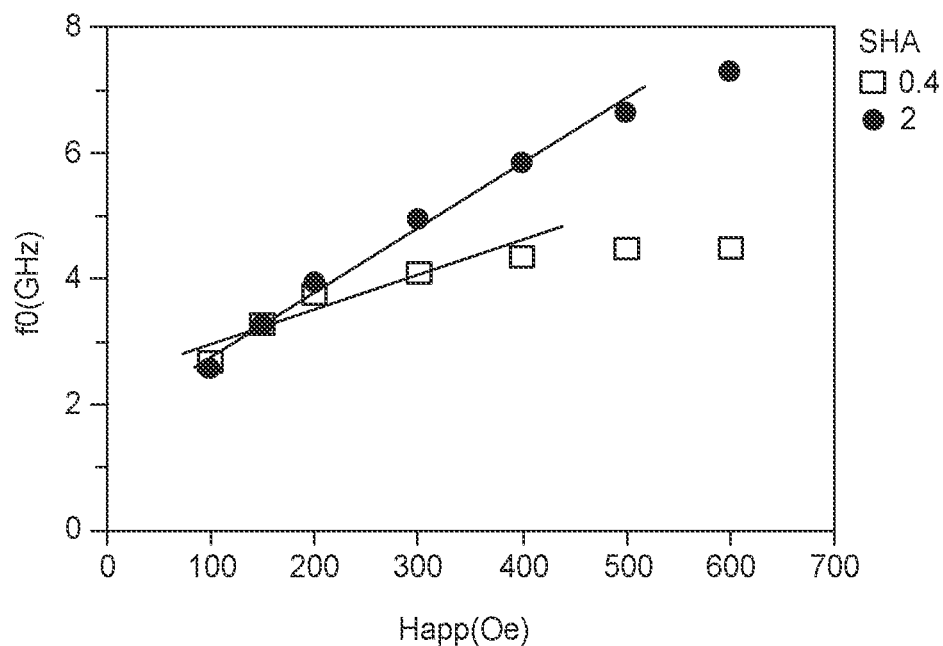
FIGS. 3A and 3B illustrate applied magnetic field vs. frequency for various SOT based STO sensors.
Figure 3B:
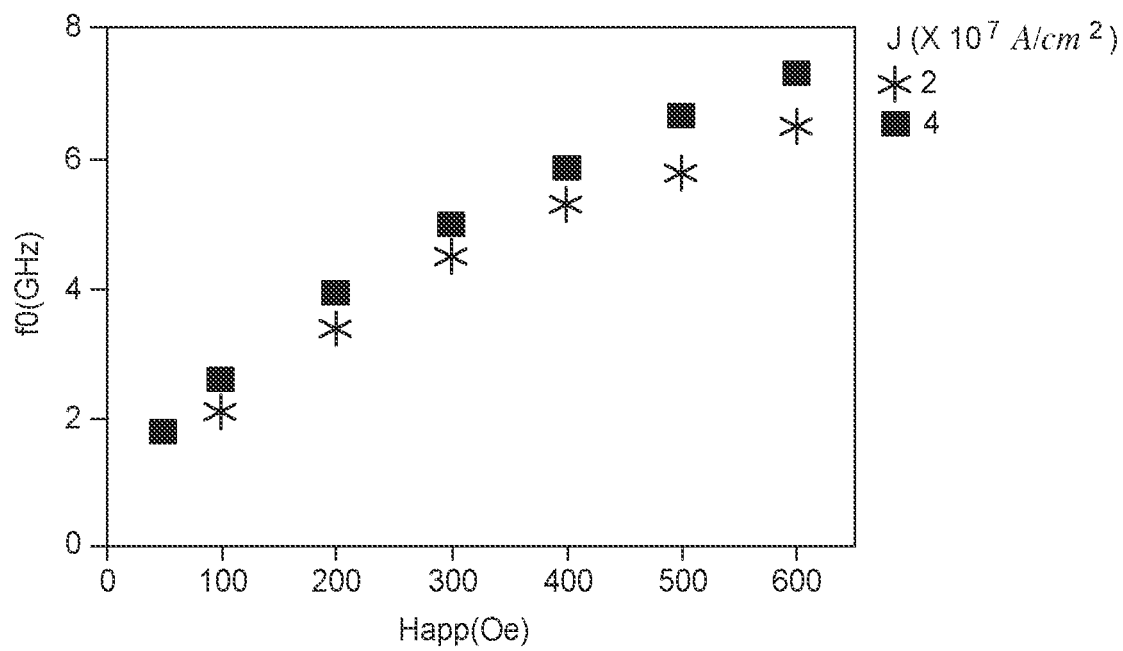

FIGS. 3A and 3B illustrate oscillator frequency vs. applied magnetic field (mimic media field (Happ (Oe))) for various oscillator devices. FIG. 3A illustrates a relationship between the applied magnetic field (Happ (Oe)) vs. detected oscillating frequency (f0 (Gz)) for a conventional STO device and for a BiSb based STO device. Conventional STO based devices typically have a smaller spin Hall angle (SHA) as compared to BiSb based STO devices under the same input current density. For example, here both the conventional STO device and the BiSb based STO device have an input of inplane current density of $J=4\times10^7$ A/cm$^2$. The conventional STO device has a SHA of 0.4, whereas the BiSb based STO device has a SHA of 2. It can also been seen that as the applied magnetic field is increased, the performance of the conventional STO device suffers because a high frequency cannot be achieved. Thus, for conventional STO devices, because of smaller SHA (here, 0.4), the detected field range will be smaller. Furthermore, signal sensitivity, measured as slope of curve, can be poor. A conventional STO device with a SHA ~0.4 has a sensitivity of about 40 GHz/T, just marginally larger than gyromagnetic ratio ~28 GHz/T. However, in a BiSb based STO device with a SHA of 2, the linear relationship between detected frequency and the applied magnetic field is expanded in a larger dynamic range. Furthermore, STO signal sensitivity can reach ~100 GHz/T, which is at least twice larger than conventional STO device. As such, a reader based on such a BiSb based STO device has a high performance.

FIG. 3B illustrates a relationship between the applied magnetic field (mimic media field (Happ (Oe))) to detected oscillating frequency (f0 (Gz)) for a BiSb based oscillator device having an SHA of 2, at a current density of $J=2\times10^7$ A/cm$^2$ and $4\times10^7$ A/cm$^2$. Although the BiSb based STO device at a $J=4\times10^7$ A/cm$^2$ exhibits a slightly larger frequency than the BiSb based STO device with a $J=2\times10^7$ A/cm$^2$, the BiSb based STO device with $J=2\times10^7$ A/cm$^2$ still maintains a linear relationship between the applied magnetic field and the frequency and minimal slope (signal detection sensitivity) difference. As such, the reliability of a BiSb based STO device at a $J=2\times10^7$ A/cm$^2$ is improved compared to a BiSb based STO device at a $J=4\times10^7$ A/cm$^2$ because a lower current can be used while still maintaining the desired performance. Therefore, the following embodiments focus on various BiSb based STO sensors.

Figure 4A:
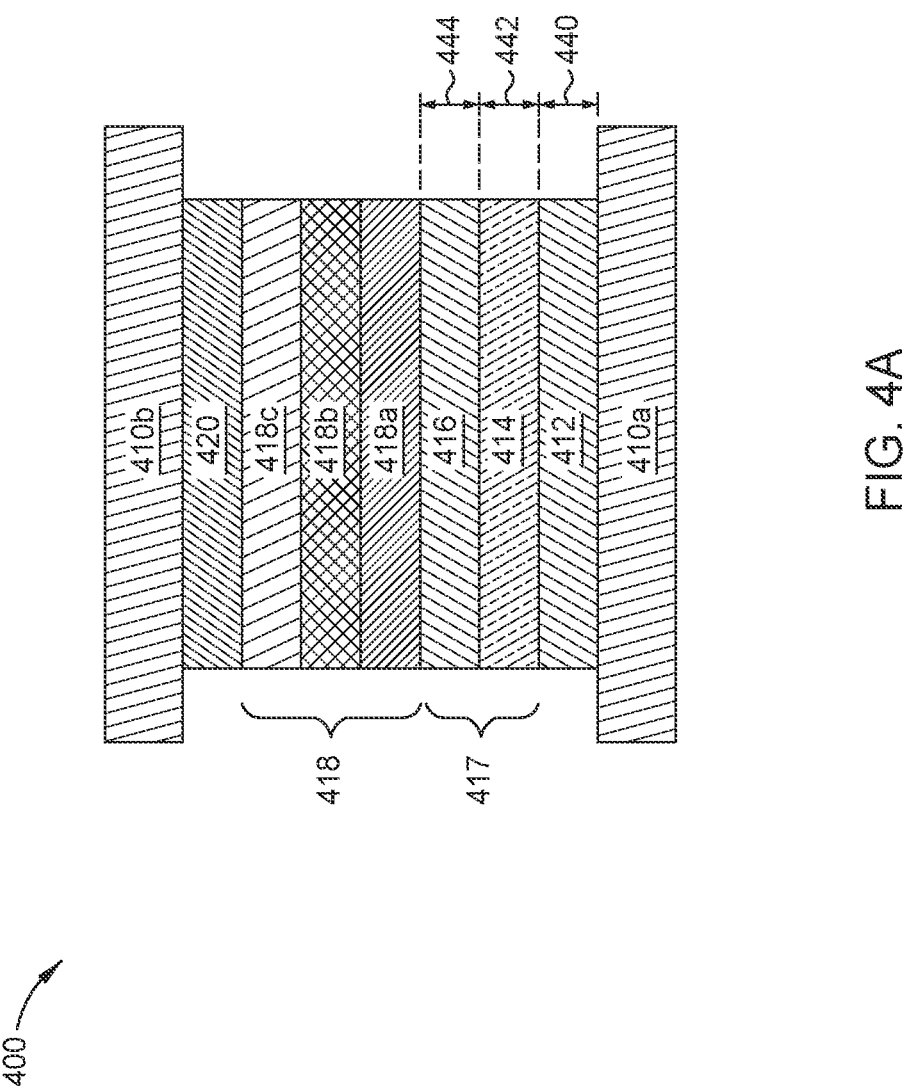
FIG. 4A illustrates a BiSb based STO device according to one embodiment.

FIG. 4A illustrates a BiSb based STO stack 400 according to one embodiment. The stack 400 may be used in the read head of the disk drive 100 of FIG. 1, the read head 211 of FIG. 2, or other suitable magnetic media drives.

The stack 400 comprises a first shield 410a, a seed layer 412 disposed over and in contact with the first shield 410a, a SOT device 417 disposed over and in contact with the seed layer 412, a magnetic tunnel junction (MTJ) structure 418 disposed over and in contact with the SOT device 417, a capping layer 420 disposed over and in contact with the MTJ structure 418, and a second shield 410b disposed over and in contact with the capping layer 420. The seed layer 412 may comprise one or more sublayers (not shown). The SOT device 417 comprises a BiSb layer 414 disposed over the seed layer 412 and a buffer layer 416 disposed over the BiSb layer 414. The MTJ structure 418 comprises a free layer (FL) 418a disposed over the buffer layer 416, an insulation layer (tunnel barrier) such as MgO 418b disposed over the FL 418a, and a pinning layer 418c disposed over the insulation layer 418b, wherein the pinning layer 418c comprises one or more sublayers (not shown).

The first shield 410a is comprised of a magnetic material such as NiFe. The second shield 410b is comprised of the same material as the first shield 410a. The seed layer 412 comprises a material selected from a group consisting of NiFeTa, RuAl, Ti, CoFeB, MgO, CrMo, Cr, NiCu, NiFe, NiAl, and combinations thereof. Example configurations of the seed layer 412 may include: NiFeTa/RuAl, Ti/CoFeB/MgO, CrMo, heated (e.g., at temperature 200° C.-400° C.) deposited Cr, and MgO/NiCu/NiFe (as used in this disclosure, a "/" is used to denote separate layers in a multilayer structure). The composition of the seed layer is chosen to enhance the [012] texture of the BiSb layer 414 such that the desired high SHA is achieved and correspondingly, Sb diffusion is minimized. As a result, the BiSb layer 414 may have a (012) crystal orientation. The buffer layer 416 comprises a material selected from the group consisting of NiOx, Ru, and combinations thereof. The composition of the buffer layer 416 is chosen to enhance the spin transmission from the BiSb layer 414 to the MTJ structure 418 and reduce direct current shunting. The FL 418a comprises a material selected from the group consisting of CoFeB, Co, CoFe, CoHf, NiFe, and combinations. The insulation layer 418b may be formed of MgO. The pinning layer 418c includes synthetic antiferromagnetic structures (SAF): a first ferromagnetic layer (FM1)/a Ru layer/a second ferromagnetic layer (FM2), where FM1 and FM2 are materials selected from the group consisting of CoFe, CoFeB, NiFe, and combinations thereof. The capping layer 420 comprises a material selected from the group consisting of, NiFeTa, NiTa, NiW, NiFeW, CoHf, CoFeHf, Pt, NiCu, CoCu, Ru, Ta, Cr, Au, Rh, other non-magnetic materials, and combinations thereof.

In embodiments where the seed layer 412 comprises Ti/CoFeB/MgO, the Ti sublayer has a thickness (not shown) in the y-direction of about 20 angstroms (Å), the CoFeB sublayer has a thickness (not shown) in the y-direction of about 5 Å, and the MgO sublayer has a thickness (not shown) in the y-direction of about 20 Å. Thus, in embodiments where the seed layer 412 comprises Ti/CoFeB/MgO, the seed layer 412 has a first thickness 440 in the y-direction of about 45 Å. In embodiments where the seed layer 412 comprises CrMo, or Cr, the seed layer 412 has a first thickness 440 in the y-direction of about 30 Å. The BiSb layer 414 has a second thickness 442 in the y-direction of about 5 nanometers (nm) to about 10 nm, wherein the thickness is configured to maintain desired surface conductivity and bulk insulation properties. In embodiments where the buffer layer 416 comprises NiOx, the buffer layer 416 has a third thickness 444 in the y-direction of about 0.5 nm to about 2 nm.

Figure 4B:
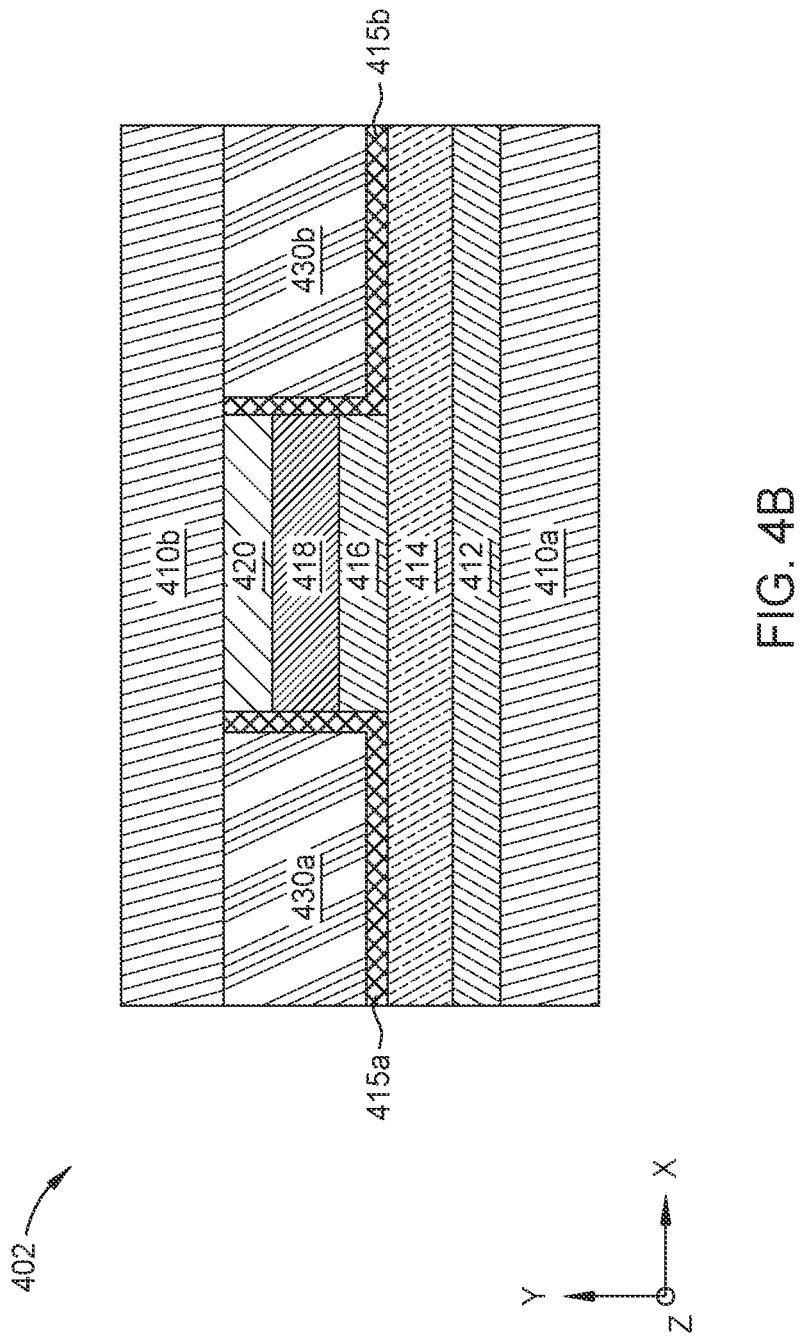
FIGS. 4B-4E illustrate various views of a top pinned BiSb based sensor according to various embodiments.

FIG. 4B illustrates an MFS view of a sensor 402 according to one embodiment. The sensor 402 is a BiSb based STO device. The sensor 402 may comprise the stack 400 of FIG. 4A. The sensor 402 may be used in the read head of the disk drive 100 of FIG. 1, the read head 211 of FIG. 2, or other suitable magnetic media drives.

The sensor 402 comprises a first shield 410a, a seed layer 412 disposed adjacent to and in contact with the first shield 410a, a BiSb layer 414 adjacent to and in contact with the seed layer 412, a buffer layer 416 adjacent to and in contact with the BiSb layer 414, a MTJ structure 418 adjacent to and in contact with the buffer layer 416, a capping layer 420 disposed adjacent to and in contact with the MTJ structure 418, and a second shield 410b disposed adjacent to and in contact with the capping layer 420. The sensor 402 further comprises a first bias 430a, and a second bias 430b, wherein the first and second bias 430a, 430b, are disposed adjacent to the buffer layer 416, the MTJ structure 418, and the capping layer 420, wherein a first insulation layer 415a separates the first bias 430a from the buffer layer 416, the MTJ structure 418, and the capping layer 420, and a second insulation layer 415b separates the second bias 430b from the buffer layer 416, the MTJ structure 418, and the capping layer 420 (i.e. the buffer layer 416, the MTJ structure 418, and the capping layer 420 are disposed between the first bias 430a and the second bias 430b in the x-direction). The first and second bias 430a, 430b are further disposed in between the BiSb layer 414 and the second shield 410b in the y-direction.

The first shield 410a, the second shield 410b, the seed layer 412, the BiSb layer 414, the buffer layer 416, and the MTJ structure 418 may be comprised of the same materials described in FIG. 4A. The first bias 430a may be a hard or soft bias. The second bias 430b comprises the same material as the first bias 430a. In embodiments where the first and second bias 430a, 430b are soft bias, the first and second bias 430a, 430b may contact the second shield 410b, as shown in FIG. 4B. In embodiments where the first and second bias 430a, 430b are hard bias, the first insulation layer 415a may further separate the first bias 430a from the second shield 410b, and the second insulation layer 415b may further separate the second bias 430b from the second shield 410b (i.e. the first and second bias do not contact the second shield 410b).

Figure 4C:
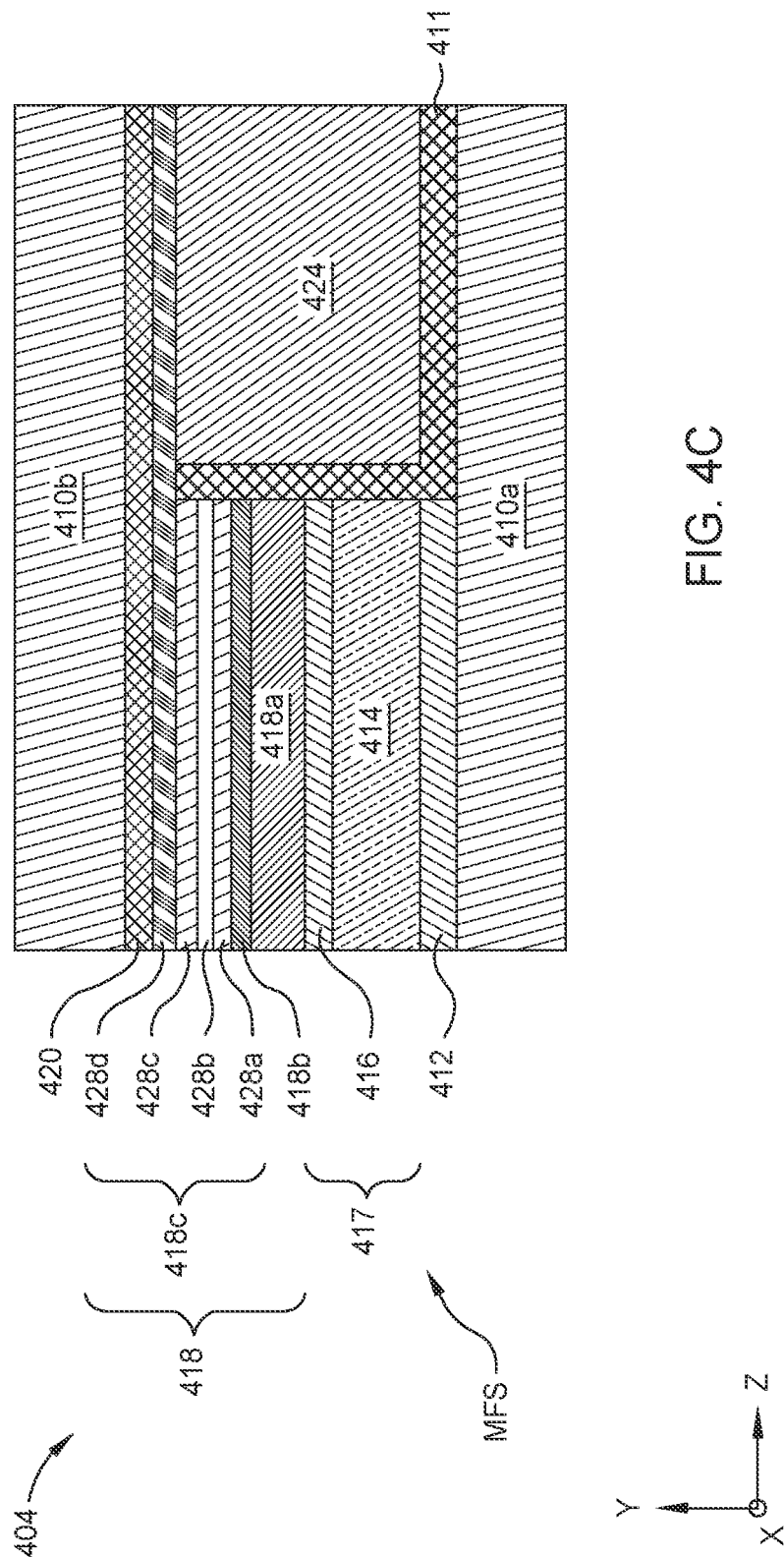

FIG. 4C illustrates a cross-section of a sensor 404 according to one embodiment. The sensor 404 is a top pinned BiSb based STO device. The sensor 404 may be the sensor 402 of FIG. 4B. The sensor 404 may comprise the stack 400 of FIG. 4A. The sensor 404 may be used in the read head of the disk drive 100 of FIG. 1, the read head 211 of FIG. 2, or other suitable magnetic media drives.

The sensor 404 comprises the stack 400 of FIG. 4A disposed at a MFS. Thus, the sensor 404 comprises a first shield 410a, a seed layer 412 disposed over and in contact with the first shield 410a, an SOT device 417 disposed over and in contact with the seed layer 412, an MTJ structure 418 disposed over and in contact with the SOT device 417, a capping layer 420 disposed over and in contact with the MTJ structure, and a second shield 410b disposed over and in contact with the capping layer 410. However, here the pinning layer 418c of the MTJ structure 418 is shown as comprising multiple layers. The pinning layer 418c comprises a first pinning layer 428a disposed over and in contact with the insulation layer 418b, a Ru layer 428b disposed over and in contact with the first pinning layer 428a, a second pinning layer 428c disposed over and in contact with the Ru layer 428b, and a third pinning layer 428d disposed over and in contact with the second pinning layer 428c.

The first pinning layer 428a, the second pinning layer 428c, and the third pinning layer 428d each comprises a ferromagnetic material such as one or more layers of CoFe, CoIr, NiFe, and CoFeX alloy wherein X=B, Ta, Re, or Ir. The first pinning layer 428a, the Ru layer 428b, and the second pinning layer 428c may have the same depth in the z-direction; however, the third pinning layer 428d may have a greater depth in the z-direction.

The sensor 404 further comprises an antiferromagnetic (AFM) layer 424 recessed from the MFS, and disposed adjacent to the SOT device 417, and adjacent to and in contact with at least a portion of the MTJ structure 418. The AFM layer 424 comprises a single or multiple layers of PtMn, NiMn, IrMn, IrMnCr, CrMnPt, FeMn, other antiferromagnetic materials, or combinations thereof. A first insulation layer 411 separates the AFM layer 424 from the first shield 410a, the SOT device 417, and at least a portion of the MTJ structure 418.

The AFM layer 424 pins the magnetic moment of the pinning layer 418c by contacting the third pinning layer 428d, which has a greater depth in the z-direction than other layers of the MTJ structure 418. However, the AFM layer 424 does not need to be disposed within the stack to pin the magnetic moment. Instead, the AFM layer 424 can be recessed from the device's backside (i.e. not exposed to MFS). This is beneficial for reducing reader RG and improving linear resolution.

Figure 4D:
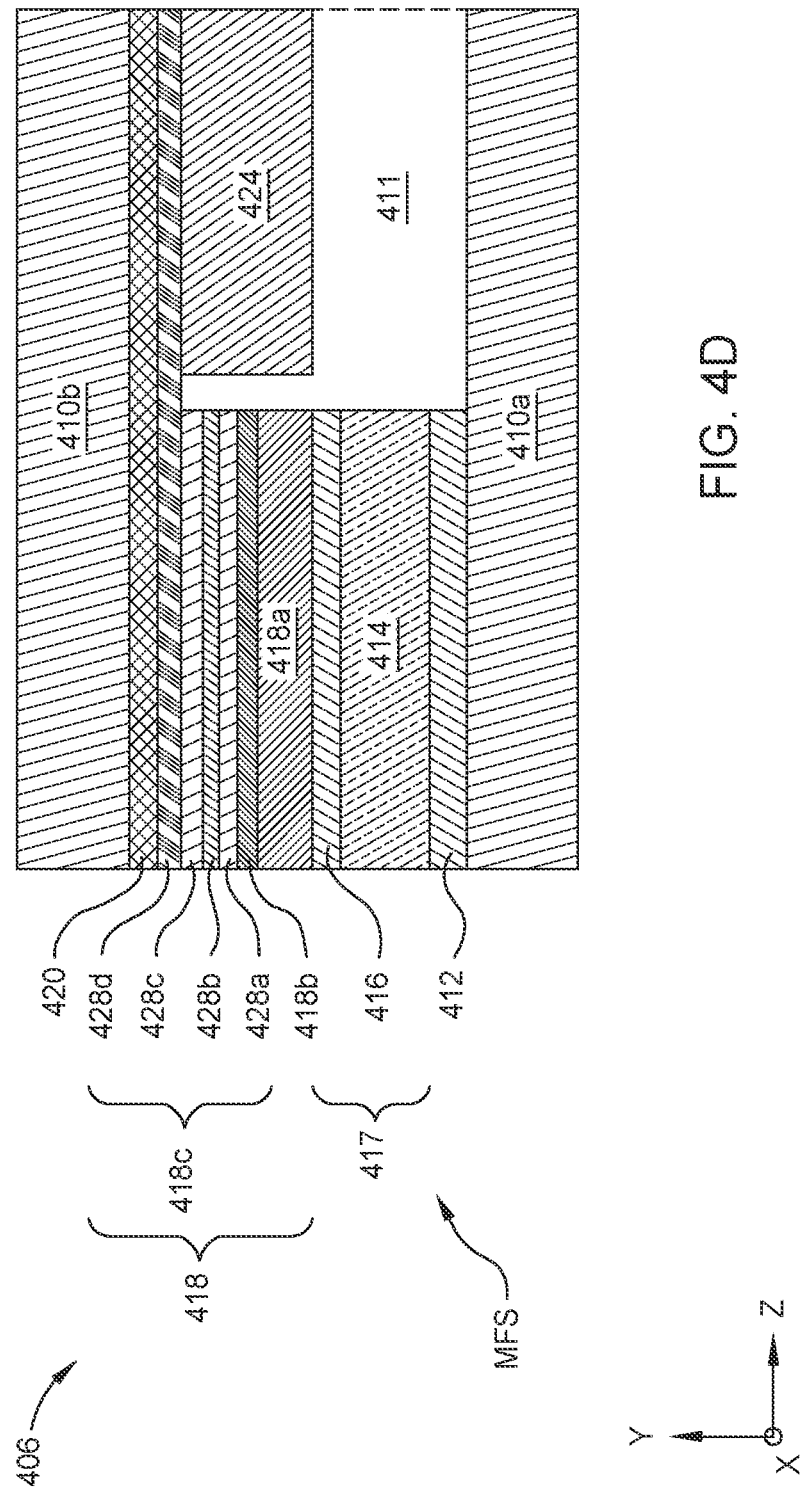

FIG. 4D illustrates a cross-section of sensor 406 according to one embodiment. The sensor 406 is the same as the sensor 404 of FIG. 4C; however, the AFM layer 424 differs. In sensor 406, the AFM layer 424 has a smaller thickness in the y-direction as compared to the AFM layer 424 of FIG. 4C. As such, the AFM layer is disposed adjacent to the FL 418a, the insulation layer 418b, the first pinning layer 428a, the Ru layer 428b, and the second pinning layer 528c.

Figure 4E:
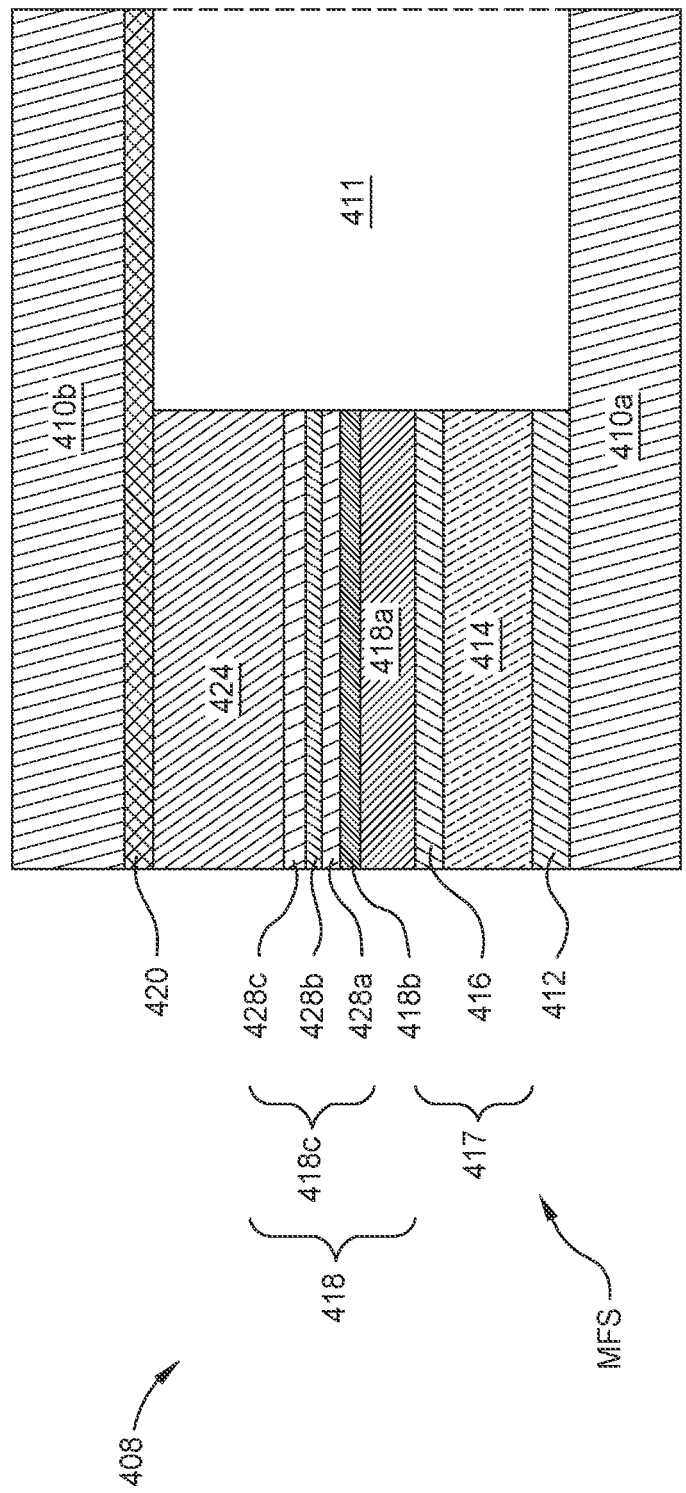

FIG. 4E illustrates a cross-section of sensor 408 according to one embodiment. The sensor 408 is similar to the sensor 404 of FIG. 4C; however, the stack and the AFM layer 424 differ. In sensor 408, there is no third pinning layer 428d, and the AFM layer 424 is disposed at the MFS. The AFM layer 424 is further disposed between the second pinning layer 428c and the capping layer 420.

Figure 5A:
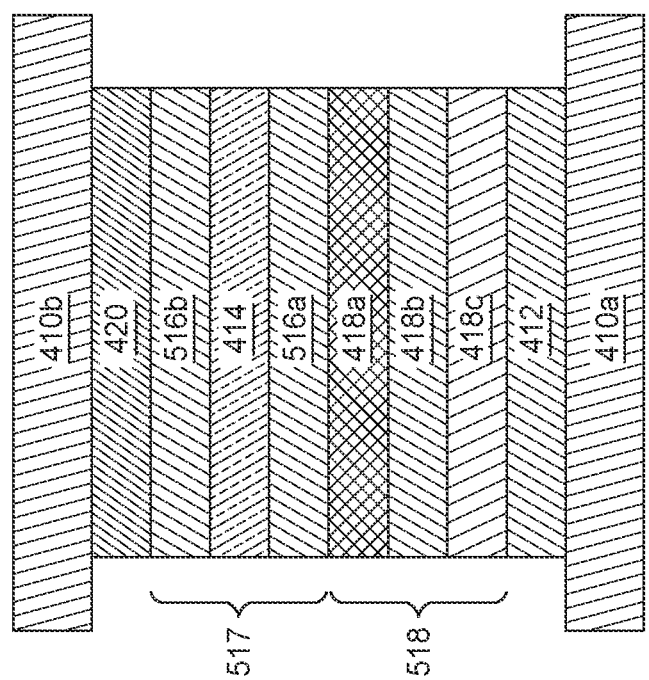
FIG. 5A illustrates a BiSb based STO device according to one embodiment.

FIG. 5A illustrates a BiSb based STO stack 500 according to one embodiment. The stack 500 may be used in the read head of the disk drive 100 of FIG. 1, the read head 211 of FIG. 2, or other suitable magnetic media drives. The stack 500 is similar to the stack 400 of FIG. 4A; however, here the layers are in a different configuration.

Here, the stack 500 comprises the seed layer 412 disposed over and in contact with the first shield 410a, a MTJ structure 518 disposed over and in contact with the seed layer, an SOT device 517 disposed over and in contact with the MTJ structure 518, the capping layer 420 disposed over and in contact with the SOT device 517, and the second shield 410b is disposed over and in contact with the capping layer 420. Since the SOT device 517 is disposed over the MTJ structure 518, the SOT device 517 comprises additional buffer layers as compared to the SOT device 417 of FIGS. 4A-4E. Here, the SOT device 517 comprises a first buffer layer 516a disposed over and in contact with the FL 418a, the BiSb layer 414 is disposed over and in contact with the first buffer layer 516a, and a second buffer layer 516b is disposed over and in contact with the BiSb layer 414. The first buffer and the second buffer layers 516a, 516b may or may not comprise of the same material as the buffer layer 416 of FIGS. 4A-4D.

Figure 5B:
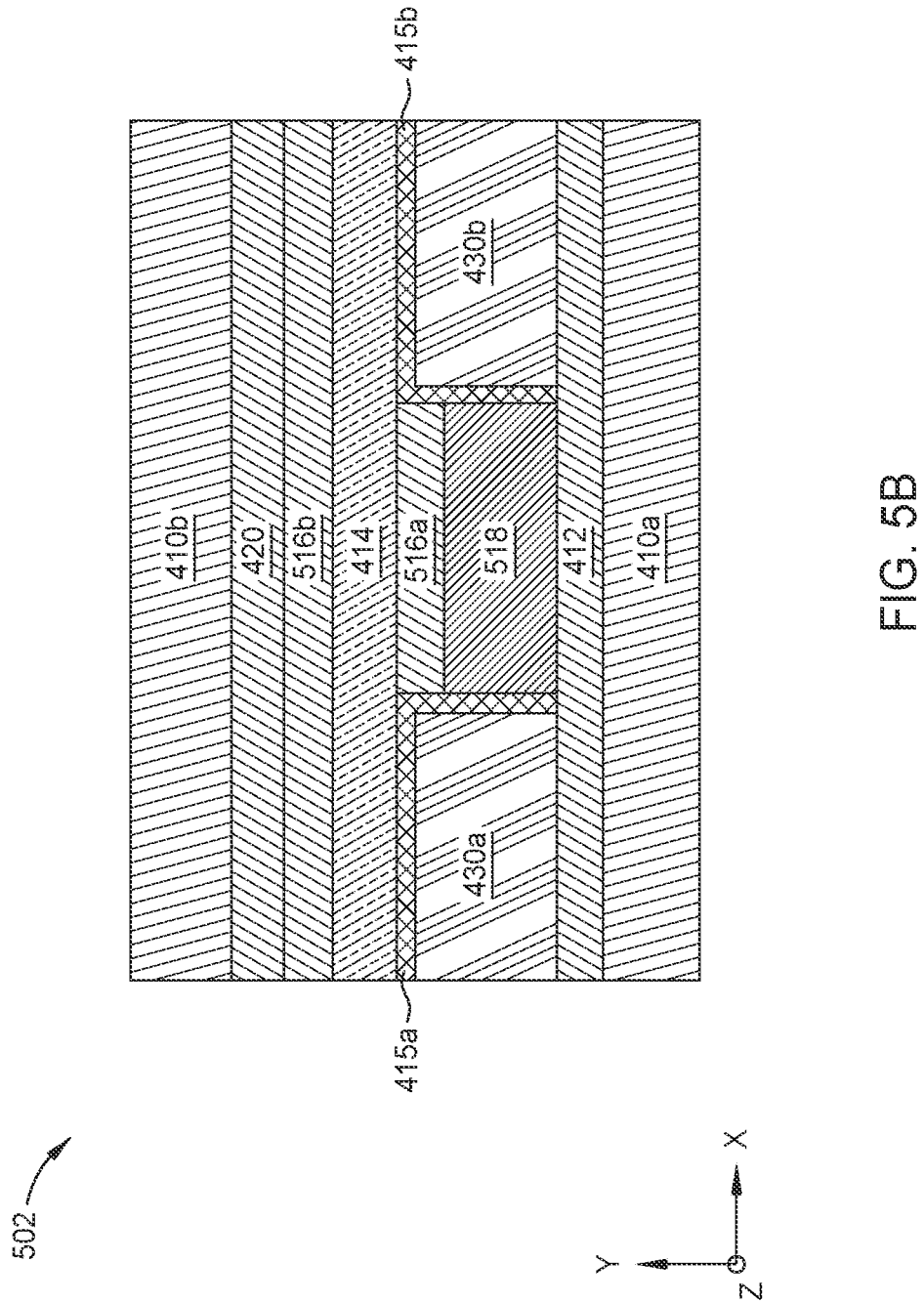
FIGS. 5B-5E illustrate various views of a bottom pinned BiSb based sensor according to various embodiments.

FIGS. 5B-5E illustrate various views of a bottom pinned BiSb based sensor according to various embodiments (compared with FIGS. 4B-4E which show a top pinned BiSb based sensor). FIG. 5B illustrates an MFS view of a sensor 502 according to one embodiment. The sensor 502 is a BiSb based STO device. The sensor 502 may be used in the read head of the disk drive 100 of FIG. 1, the read head 211 of FIG. 2, or other suitable magnetic media drives.

The sensor 502 comprises a first shield 410a, a seed layer 412 disposed adjacent to and in contact with the first shield 410a, a MTJ structure 518 disposed adjacent to and in contact with the seed layer 412, a first buffer layer 516a disposed adjacent to and in contact with the MTJ structure 518, a BiSb layer 414 disposed adjacent to and in contact the first buffer layer 516a, a second buffer layer 516b disposed adjacent to and in contact with the BiSb layer 414, a capping layer 420 disposed adjacent to and in contact with the second buffer layer 516b, and a second shield 410b, disposed adjacent to and in contact with the capping layer 420.

The sensor further comprises a first bias 430a, and a second bias 430b, wherein the first and second bias 430a, 430b, are disposed adjacent to the MTJ structure 418 and the first buffer layer 516a, wherein a first insulation layer 415a separates the first bias 430a from the MTJ structure 518 and the first buffer layer 516a, and a second insulation layer 415b separates the second bias 430b and the MTJ structure 518 and the first buffer layer 516a (i.e. the MTJ structure 518 and the first buffer layer 516a are disposed between the first and second bias 430a, 430b in the x-direction). The first and second bias 430a, 430b are further disposed in between the seed layer 412 and the BiSb layer 414 in the y-direction. In some embodiments, the first and second bias 430a, 430b are disposed in contact with the seed layer 412, as shown. In some embodiments, first insulation layer 415a further insulates the first bias 430a from the seed layer 412, and the second insulation layer 415b insulates the second bias 430b from the seed layer 412 (i.e. the first and second bias 430a, 430b do not contact the seed layer 412).

The first shield 410a, the seed layer 412, the MTJ structure 518, the first buffer layer 516a, the first bias 430a, the second bias 430b, the BiSb layer 414, the second buffer layer 516b, the capping layer 420, and the second shield 410b, may be comprised of the same materials as for the corresponding layers as described in FIGS. 4A-4E. In particular, the first buffer layer 516a and the second buffer layer 516b may be comprised of the same materials as for the buffer layer 416.

Figure 5C:
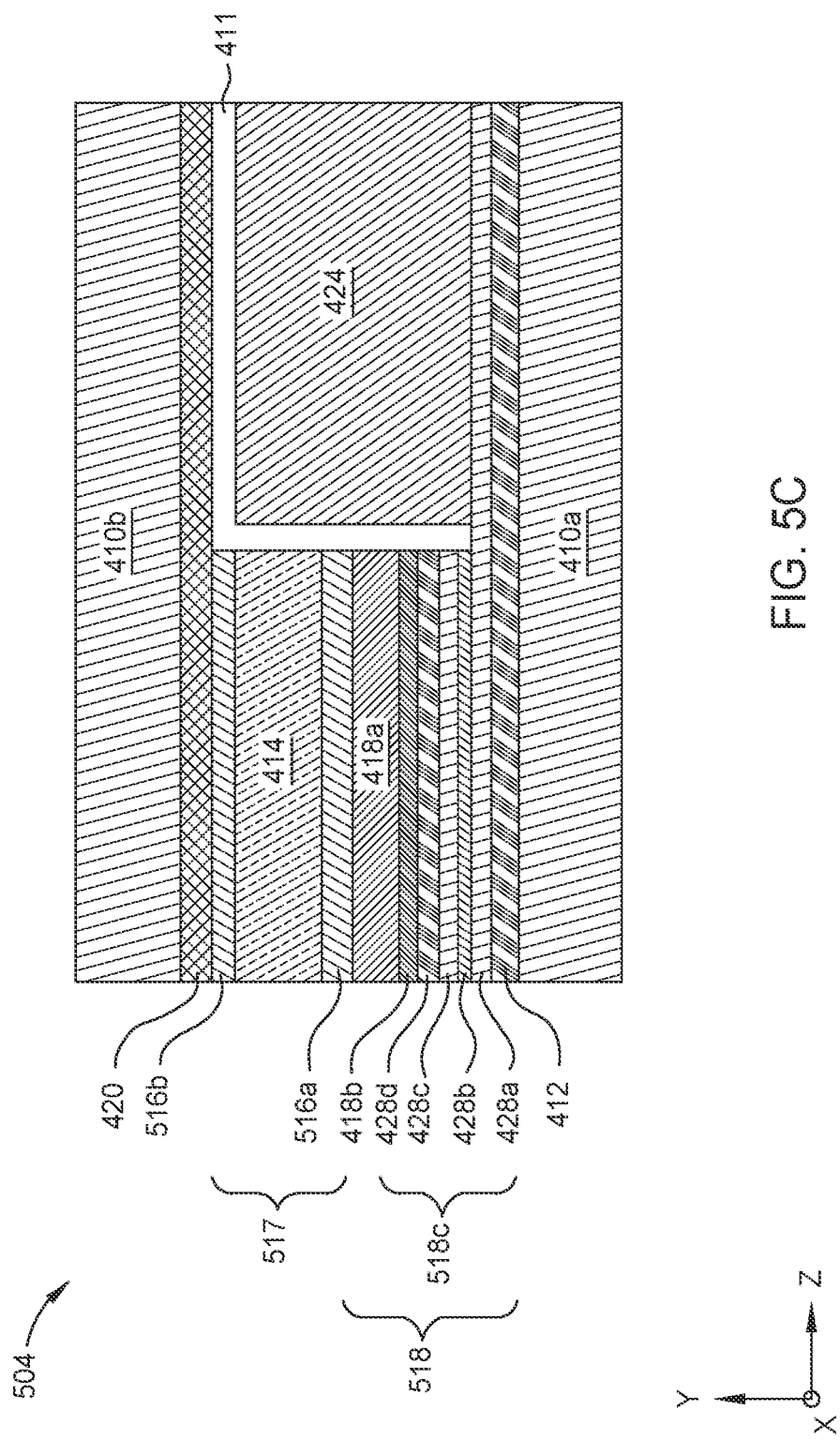

FIG. 5C illustrates a cross-sectional side view of a sensor 504 according to one embodiment. The sensor 504 is similar to sensor 404 of FIG. 4C; however, here the sensor 504 is bottom pinned BiSb based STO device. The sensor 504 may be sensor 502 of FIG. 5B. The sensor 504 may be used in the read head of the disk drive 100 of FIG. 1, the read head 211 of FIG. 2, or other suitable magnetic media drives.

The sensor 504 comprises the stack 500 of FIG. 5A, wherein the stack is disposed at a MFS. Thus, the sensor 504 comprises the first shield 410a, the seed layer 412 disposed over and in contact with the first shield 410a, the MTJ structure 518 disposed over and in contact with the seed layer 412, the SOT device 517 disposed over and in contact with the MTJ structure 518, the capping layer 420 disposed over and in contact with the SOT device 517, and the second shield 410b disposed over and in contact with the capping layer 420. However, here the pinning layer 518c of the MTJ structure 518 is shown as comprising three layers rather than two layers in comparison to FIG. 4C. The pinning layer 518c comprises the first pinning layer 428a over and in contact with the seed layer 412, the Ru layer 428b disposed over and in contact with the first pinning layer 428a, and the second pinning layer 428c disposed between the Ru layer 428b and the insulating layer 418b.

Similar to sensor 404 of FIG. 4C, the sensor 504 further comprises the antiferromagnetic (AFM) layer 424 recessed from the MFS. The AFM layer 424 is disposed adjacent to the SOT device 517, and adjacent to and in contact with at least a portion of the MTJ structure 518. The first insulation layer 411 separates the AFM layer 424 from at least a portion of the MTJ structure 518, the SOT device 517, and the capping layer 420.

The AFM layer 424 pins the magnetic moment of the pinning layer 518c. However, the AFM layer 424 does not need to be disposed within the stack to pin the magnetic moment. Instead, the AFM layer 424 can be recessed from the device's backside (i.e. not exposed to MFS). This is beneficial for reducing reader (read gap) RG and improving linear resolution.

Figure 5D:
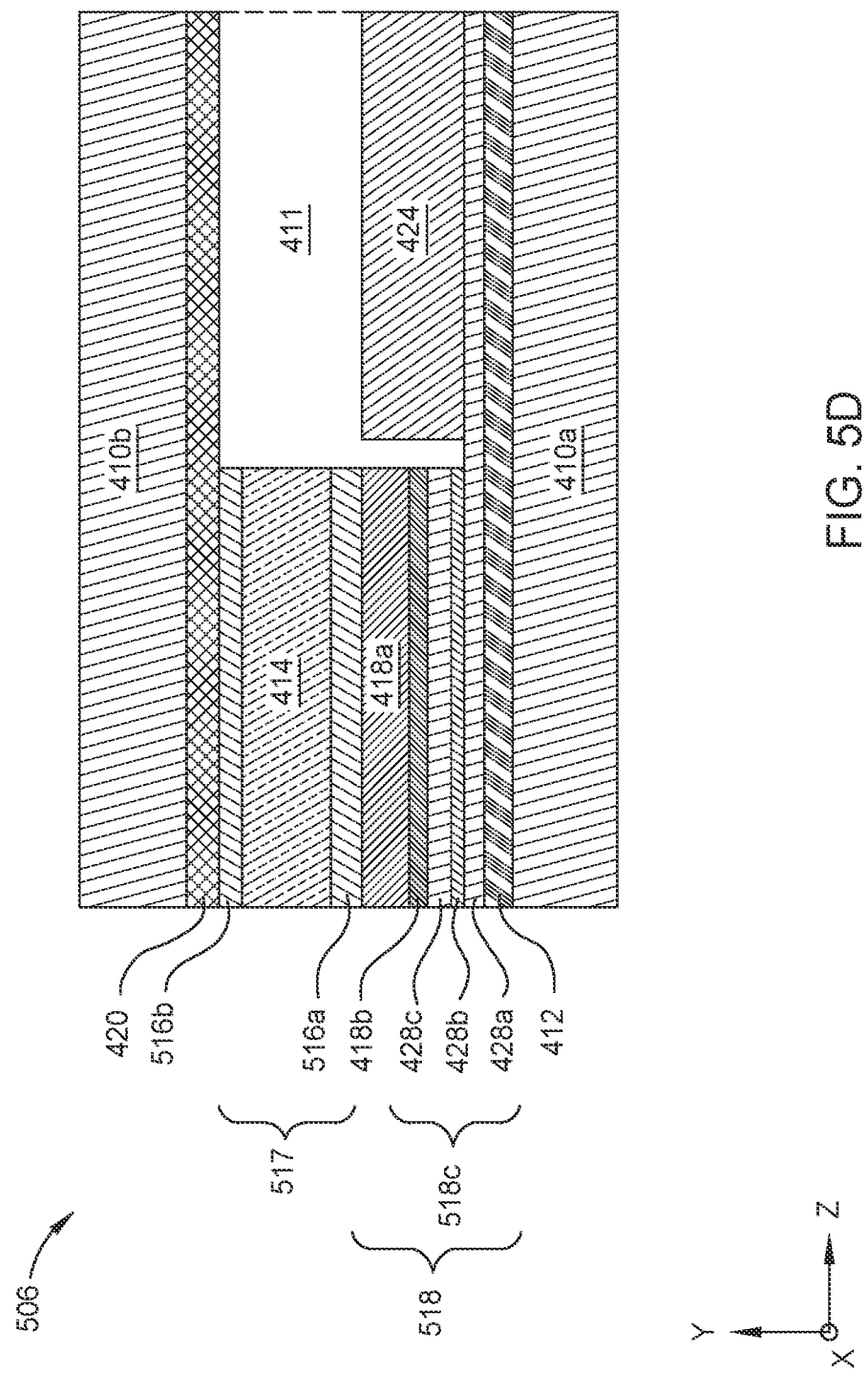

FIG. 5D illustrates a cross-sectional side view of a sensor 506 according to one embodiment. The sensor 506 is the same as the sensor 504 of FIG. 5C; however, the thickness of the AFM layer 424 differs. In sensor 506, the AFM layer 424 has a smaller thickness in the y-direction as compared to the AFM layer 424 of FIG. 5C. As such, the AFM layer is disposed adjacent to the MTJ structure 518, but is not adjacent to the SOT device 517.

Figure 5E:
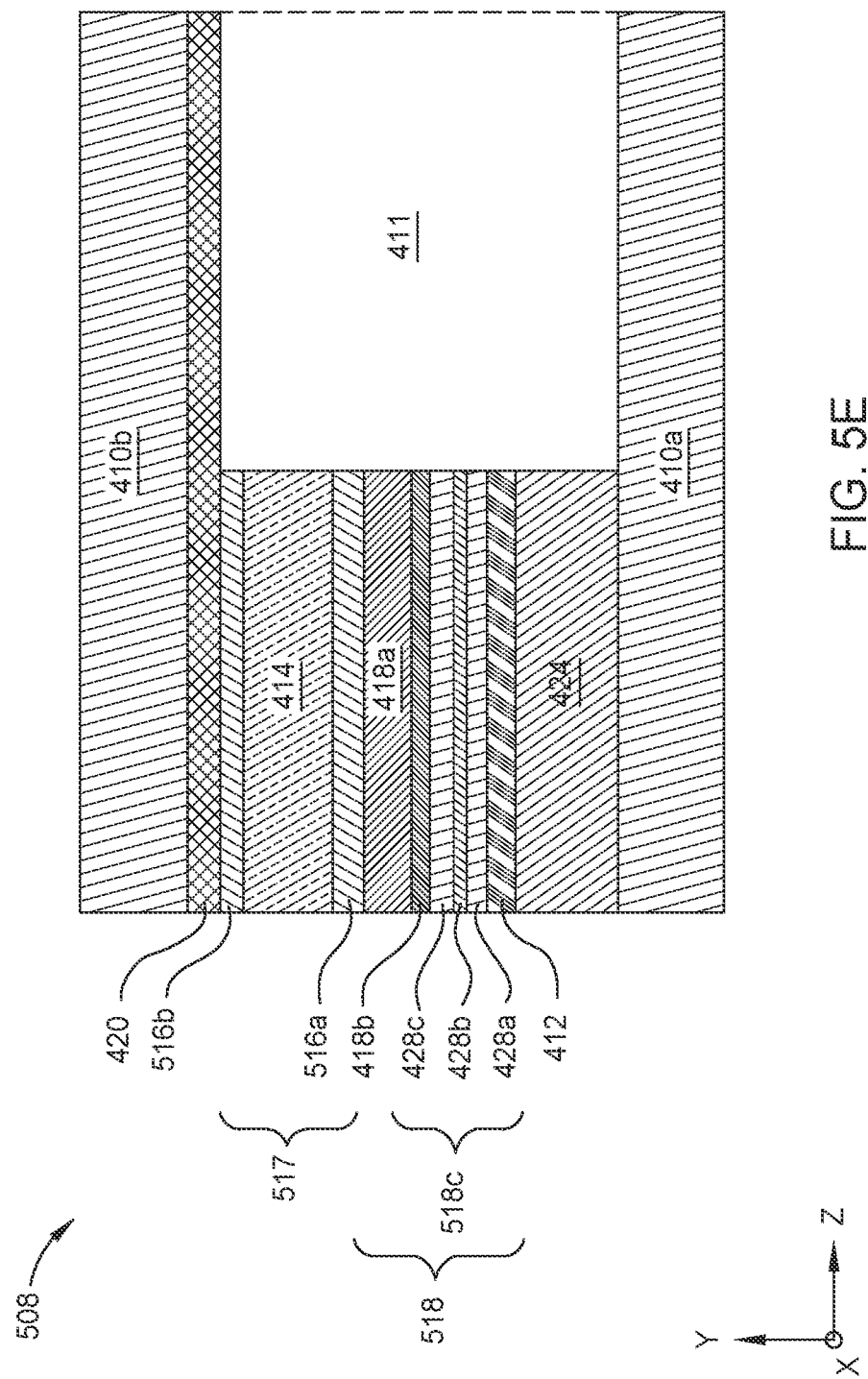

FIG. 5E illustrates a cross-section of sensor 508 according to one embodiment. The sensor 508 is the same as the sensor 504 of FIG. 5C; however, the AFM layer 424 differs. In sensor 508, the AFM layer 424 is disposed at the MFS, and further disposed between the seed layer 412 and the first shield 410a.

It is to be understood that although the various layers described in FIGS. 4A-4E and 5A-5E may be depicted as being a certain depth, width, or thickness, this is not to be considered limiting, but merely for illustrative purposes. For example, in FIGS. 4C and 4D, although the first and second shields 410a, 410b are shown as being the same depth in the z-direction as the third pinning layer 428d and the capping layer 420, the first and second shields 410a, 410b may be much larger than the other layers of the sensor 404. Thus, unless specifically described the layers FIGS. 4A-4E and 5A-5E may be larger or smaller depending on the embodiment.

It is to be understood that the above embodiments, are merely examples of configurations of sensors, and the sensors may comprise more or less layers depending on the embodiment.

As discussed above in FIGS. 3A and 3B, because the signal output is detected at the frequency domain, the resistance across the sensor does not significantly impact the noise. Thus, the sensor signal to noise ratio (SNR) can be improved by using a MTJ structure with a higher resistance per area, such as the MTJ structures 418 and 518 described in FIGS. 4A-4E and 5A-5E, which will produce a higher tunnel magnetoresistance (TMR) ratio to achieve a higher signal without suffering higher noise. Thus, by utilizing a BiSb layer as a topological insulator in a SOT-based STO device, the spin Hall angle can be increased, thereby improving the spin torque efficiency and reliability of the STO device.

In one embodiment, a sensor, comprising: a seed layer; a bismuth antimony (BiSb) layer disposed over the seed layer; a buffer layer disposed over the BiSb layer; a magnetic tunnel junction (MTJ) structure disposed over the buffer layer, wherein the seed layer, the BiSb layer, the buffer layer, and the MTJ structure are disposed at a media facing surface (MFS); and an antiferromagnetic (AFM) layer.

The BiSb layer has a (012) orientation. The AFM layer is recessed from the MFS. The sensor, wherein the AFM layer contacts at least a portion of the MTJ structure. The sensor, wherein the AFM layer disposed at the MFS and adjacent to the seed layer. A magnetic recording head comprising the sensor is also disclosed wherein magnetic recording head comprises a first shield and a second shield. The sensor is disposed between the first shield and the second shield; the BiSb layer is spaced a first distance from the first shield, and spaced a second distance from the second shield, wherein the first distance and the second distance are different; and the AFM layer is spaced a third distance from the first shield, and spaced a fourth distance from the second shield. The third distance and the fourth distance are different. The first distance and the third distance are different. A magnetic recording device comprising the magnetic recording head is also disclosed. The magnetic recording device comprises a magnetic recording media; the magnetic recording head; and a control unit configured to: flow current through the bismuth antimony (BiSb) layer while reading data from the magnetic recording media; and measure frequency of a precession of a free layer in the sensor, wherein the precession is responsive to a magnetic field generated by the magnetic recording media.

In another embodiment, a sensor, comprising: a seed layer; a magnetic tunnel junction (MTJ) structure disposed over the seed layer; a first buffer layer disposed over the MTJ structure; a bismuth antimony (BiSb) layer disposed over the first buffer layer; a second buffer layer disposed over the BiSb layer; a capping layer disposed over the second buffer layer; wherein the seed layer, the MTJ structure, the first buffer layer, the BiSb layer, the second buffer layer, and the capping layer are disposed at a media facing surface (MFS); and an antiferromagnetic (AFM) layer, wherein the AFM is disposed between the seed layer and the capping layer.

The AFM layer is disposed at the MFS adjacent the MTJ structure. The AFM layer and a free layer of the MTJ structure are at least partially aligned in a direction perpendicular to the MFS. The AFM layer and a free layer of the MTJ structure are not aligned in a direction perpendicular to the MFS. A magnetic recording head comprising the sensor is also disclosed as is a magnetic recording device comprising the magnetic recording head. The magnetic recording device comprises a magnetic recording media; the magnetic recording head; and a control unit configured to: flow current through the bismuth antimony (BiSb) layer while reading data from the magnetic recording media; and measure frequency of a precession of a free layer in the sensor, wherein the precession is responsive to a magnetic field generated by the magnetic recording media.

In yet another embodiment, a sensor comprises: a bismuth antimony (BiSb) layer having a (012) orientation; a free layer; an MgO layer; a pinning layer; a capping layer; an antiferromagnetic (AFM) layer; and a bias layer disposed at a media facing surface (MFS).

A magnetic recording head comprising the sensor is also disclosed where the magnetic recording head comprises: a first shield; and a second shield, wherein the bias layer is disposed between the BiSb layer and the second shield. A magnetic recording device comprising the magnetic recording head is also disclosed. The magnetic recording device comprises a magnetic recording media; the magnetic recording head; and a control unit configured to: flow current through the bismuth antimony (BiSb) layer while reading data from the magnetic recording media; and measure frequency of a precession of a free layer in the sensor, wherein the precession is responsive to a magnetic field generated by the magnetic recording media.

In another embodiment, a method of using a magnetic recording head comprises: flowing a current through a spin orbit torque (SOT) device of a spin torque oscillator (STO) sensor while reading data from a magnetic recording media; and measuring frequency of a precession of the a free layer in the STO sensor, wherein the precession is responsive to a magnetic field generated by the magnetic recording media. The SOT device has a spin Hall angle of 2 or more. The SOT device is disposed in a read head of the magnetic recording head. The current is flowed in-plane inside a BiSb layer of the SOT device. The method further includes flowing a small sensing current perpendicular to a plane of the magnetic recording media, wherein a signal is read out by the measuring. There is a linear relationship between the measured frequency and an applied magnetic field. The method further comprises detecting a bit recorded on the magnetic recording media based upon the measured frequency.

While the foregoing is directed to embodiments of the present disclosure, other and further embodiments of the disclosure may be devised without departing from the basic scope thereof, and the scope thereof is determined by the claims that follow.

What is claimed is:

1. A sensor, comprising:
   a seed layer;
   a magnetic tunnel junction (MTJ) structure disposed over the seed layer;
   a first buffer layer disposed over the MTJ structure;
   a bismuth antimony (BiSb) layer disposed over the first buffer layer;
   a second buffer layer disposed over the BiSb layer;
   a capping layer disposed over the second buffer layer, wherein the seed layer, the MTJ structure, the first buffer layer, the BiSb layer, the second buffer layer, and the capping layer are disposed at a media facing surface (MFS); and
   an antiferromagnetic (AFM) layer, wherein the AFM layer is adjacent to the MTJ structure.

2. The sensor of claim 1, wherein the AFM layer is disposed at the MFS and in contact with the seed layer.

3. The sensor of claim 1, wherein the AFM layer and a free layer of the MTJ structure are at least partially aligned in a direction perpendicular to the MFS.

4. The sensor of claim 1, wherein the AFM layer and a free layer of the MTJ structure are not aligned in a direction perpendicular to the MFS.

5. The sensor of claim 1, wherein the first buffer layer is disposed in contact with a free layer of the MTJ structure.

6. A magnetic recording head comprising the sensor of claim 1.

7. A magnetic recording device, comprising:
   a magnetic recording media;

the magnetic recording head of claim 6; and
a control unit configured to:
- flow current through the bismuth antimony (BiSb) layer while reading data from the magnetic recording media; and
- measure frequency of a precession of a free layer in the sensor, wherein the precession is responsive to a magnetic field generated by the magnetic recording media.

8. A sensor, comprising:
- a seed layer;
- a magnetic tunnel junction (MTJ) structure disposed over the seed layer, the MTJ structure comprising:
  - a pinning layer disposed on the seed layer;
  - an insulation layer disposed over the seed layer; and
  - a free layer disposed on the insulation layer;
- a first buffer layer disposed over the MTJ structure;
- a bismuth antimony (BiSb) layer disposed over the first buffer layer;
- a second buffer layer disposed over the BiSb layer;
- a capping layer disposed over the second buffer layer, wherein the seed layer, the MTJ structure, the first buffer layer, the BiSb layer, the second buffer layer, and the capping layer are disposed at a media facing surface (MFS); and
- an antiferromagnetic (AFM) layer, wherein the AFM layer is adjacent to the MTJ structure and in contact with the seed layer.

9. The sensor of claim 8, wherein the AFM layer is disposed at the MFS.

10. The sensor of claim 8, wherein the AFM layer is recessed from the MFS.

11. The sensor of claim 8, wherein the AFM layer and the free layer are at least partially aligned in a direction perpendicular to the MFS.

12. The sensor of claim 8, wherein the AFM layer and the free layer are unaligned in a direction perpendicular to the MFS.

13. A magnetic recording head comprising the sensor of claim 8.

* * * * *